United States Patent
Cheng et al.

(10) Patent No.: US 12,031,718 B2
(45) Date of Patent: *Jul. 9, 2024

(54) SYSTEM AND METHOD TO PREVENT THE OXIDIZER OVERHEATING USING COLD SIDE BYPASS FOR A VOCS TREATMENT SYSTEM WITH SERIES ROTOR

(71) Applicants: DESICCANT TECHNOLOGY CORPORATION, Taoyuan (TW); DESICCANT TECHNOLOGY(SHANGHAI) CORPORATION, Shanghai (CN)

(72) Inventors: Shih-Chih Cheng, Taoyuan (TW); Kuo-Yuan Lin, Taoyuan (TW); Ya-Ming Fu, Taoyuan (TW); Chung-Hsien Chen, Taoyuan (TW); Pang-Yu Liu, Taoyuan (TW)

(73) Assignees: DESICCANT TECHNOLOGY CORPORATION, Taoyuan (TW); DESICCANT TECHNOLOGY(SHANGHAI) CORPORATION, Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/067,051

(22) Filed: Dec. 16, 2022

(65) Prior Publication Data
US 2023/0122176 A1    Apr. 20, 2023

Related U.S. Application Data

(62) Division of application No. 17/367,464, filed on Jul. 5, 2021, now Pat. No. 11,767,976.

(30) Foreign Application Priority Data

Jul. 22, 2020 (TW) ................. 109124742

(51) Int. Cl.
B01D 53/02 (2006.01)
B01D 53/08 (2006.01)
F23G 7/06 (2006.01)

(52) U.S. Cl.
CPC ............... *F23G 7/06* (2013.01); *B01D 53/08* (2013.01); *B01D 2257/708* (2013.01); (Continued)

(58) Field of Classification Search
CPC .......... B01D 2257/708; B01D 2258/06; B01D 53/06; B01D 53/08; F23G 2201/60; (Continued)

(56) References Cited

U.S. PATENT DOCUMENTS 5,578,276 A    11/1996 Klobucar
5,730,945 A    3/1998 Klobucar
(Continued)

FOREIGN PATENT DOCUMENTS

CN    101788152 A    7/2010
CN    106139821 A    11/2016
(Continued)

OTHER PUBLICATIONS

Office Action for Taiwanese Patent Application No. 109124742 mailed Sep. 30, 2021.
(Continued)

*Primary Examiner* — Christopher P Jones
(74) *Attorney, Agent, or Firm* — Perilla Knox & Hildebrandt LL; Kenneth A. Knox

(57) ABSTRACT

A system and method to prevent an oxidizer overheating using cold side bypass for a volatile organic compounds (VOCs) treatment system with a series rotor are described, which is mainly used in the organic waste air treatment system. The system is equipped with a thermal oxidizer (to), a first heat exchanger, a second heat exchanger, a third heat
(Continued)

exchanger, a first cold-side transporting pipeline, a first adsorption rotor, a second adsorption rotor, and a chimney. A cold-side proportional damper is installed between the first desorption-treated air pipeline and the first cold-side transporting pipeline, or it is installed on the first desorption-treated air pipeline. When the VOCs concentration becomes higher, the cold-side proportional damper can regulate the airflow to adjust the heat-recovery amount or concentration, when treating the organic waste air, it can prevent the thermal oxidizer from being overheated due to high oxidizer temperature, and protect from thermal oxidizer shut-down.

22 Claims, 8 Drawing Sheets

(52) U.S. Cl.
CPC ...... *F23G 2201/60* (2013.01); *F23G 2207/50* (2013.01); *F23G 2209/14* (2013.01); *F23G 2900/00001* (2013.01)

(58) Field of Classification Search
CPC ............. F23G 2201/90; F23G 2206/10; F23G 2207/50; F23G 2209/14; F23G 2900/00001; F23G 7/06; F23G 7/068
See application file for complete search history.

(56) References Cited

U.S. PATENT DOCUMENTS

| 2007/0181465 | A1 | 8/2007 | Collette |
| 2010/0130387 | A1 | 5/2010 | Davis et al. |
| 2012/0302797 | A1 | 11/2012 | Devaux et al. |

FOREIGN PATENT DOCUMENTS

| CN | 210206361 | U | 3/2020 |
| CN | 212481331 | U | 2/2021 |
| TW | M576495 | U | 4/2019 |
| TW | M592337 | U | 3/2020 |
| TW | M604865 | U | 12/2020 |

OTHER PUBLICATIONS

Notice of Allowance for Taiwanese Patent Application No. 109124742 mailed Jan. 7, 2022.

Non-Final Office Action for U.S. Appl. No. 17/349,514 mailed Feb. 28, 2023.

Non-Final Office Action for U.S. Appl. No. 17/367,464 mailed Dec. 22, 2022.

Notice of Allowance for U.S. Appl. No. 17/367,464 mailed May 8, 2023.

SYSTEM AND METHOD TO PREVENT THE OXIDIZER OVERHEATING USING COLD SIDE BYPASS FOR A VOCS TREATMENT SYSTEM WITH SERIES ROTOR

CROSS-REFERENCE TO RELATED APPLICATIONS

This application is a divisional of U.S. patent application Ser. No. 17/367,464 filed Jul. 5, 2021, entitled "SYSTEM AND METHOD TO PREVENT THE OXIDIZER OVERHEATING USING COLD SIDE BYPASS FOR A VOCS TREATMENT SYSTEM WITH SERIES ROTOR," which claims the benefit of and priority to Taiwan (TVV) Patent Application No. 109124742 filed Jul. 22, 2020, the contents of both of which hereby being incorporated by reference in their entireties herein.

FIELD OF THE DISCLOSURE

This disclosure refers to an "System and method to prevent the oxidizer overheating using cold side bypass for a VOCs treatment system with series rotor", particularly refers to the performance of modulating the heat-recovery amount when VOCs concentration becomes thicker. When treating the organic exhaust air, it can prevent the Thermal Oxidizer (TO) from being shut-down due to oxidizer temperature overheating. As we found, the reason of overheating is because of the oxidation of VOCs of the very high concentration compounds in the desorbed VOCs stream. This disclosure is suitable for the organic waste air treatment systems or similar equipment used in the semiconductor industry, optoelectronics Industry or chemical industry.

BACKGROUND

At present, there are a lot of VOCs exhaust from the manufacturing processes of semiconductor or optoelectronics Industry According to the EPA's low, each plant have to install the VOC treatment equipment to prevent from VOCs air pollution being expelled to the atmosphere directly. Most popular VOCs treatment equipment are mainly consisted of at least one Adsorption Rotor and one thermal oxidizer. In such a VOC treatment equipment, The concentrated VOC gases desorbed from the rotor is sent to the thermal oxidizer to burn off, And the burnt exhaust is sent to the Chimney to discharge off.

Yet, recently, the government are paying great attention to the air pollution issue and have set the respective air quality standards in the chimney exhaust discharging standards, and the standards are regularly discussed and revised per the development of international control trend.

According to the aforesaid defect, the inventor of this disclosure is dedicated to study, design and build an "System and method to prevent the oxidizer overheating using cold side bypass for a VOCs treatment system with series rotor" in the prospective of improving the treating efficiency of VOC waste air, making users able to operate the system and equipment easily and use them in a convenient matter, and this is the motivation of the inventor inventing this disclosure.

BRIEF SUMMARY

The main purpose of this disclosure is to provide an "System and method to prevent the oxidizer overheating using cold side bypass for a VOCs treatment system with series rotor", which is mainly used on the organic waste air treatment system. It is equipped with a Thermal Oxidizer (TO), a First Heat Exchanger, a Second Heat Exchanger, a Third Heat Exchanger, a First Cold-Side Transporting Pipeline, a First Adsorption Rotor, a Second Adsorption Rotor and a Chimney. There is a Cold-Side Proportional Damper installed between the First Desorption-Treated Air Pipeline and the First Cold-Side Transporting Pipeline, or it is installed on the First Desorption-Treated Air Pipeline. When the VOCs concentration becomes thicker, the Cold-Side Proportional Damper can regulate the airflow to adjust the heat-recovery amount or concentration. When treating the organic waste air, it can prevent the Thermal Oxidizer (TO) from being overheated due to high oxidizer temperature, and can protect it from Thermal Oxidizer shut-down and increase the overall practicality.

The second purpose of this disclosure is to provide an "System and method to prevent the oxidizer overheating using cold side bypass for a VOCs treatment system with series rotor", in which there is a Cold-Side Proportional Damper installed between the First Desorption-Treated Air Pipeline and the First Cold-Side Transporting Pipeline, when the VOCs concentration in the First Cold-Side Transporting Pipeline increases, it can use the Cold-Side Proportional Damper to transport part of the desorption-treated air in the First Desorption-Treated Air Pipeline to the First Cold-Side Transporting Pipeline, making the desorption-treated air in the First Cold-Side Transporting Pipeline once again mix up with the desorption-treated air in the First Desorption-Treated Air Pipeline, which makes the desorption-treated air in the First Desorption-Treated Air Pipeline with lower temperature cool down the hotter desorption-treated air in the First Cold-Sid Transporting Pipeline, and thus has the ability to adjust the amount or concentration of heat recovery. When treating the organic waste air, it can prevent the Thermal Oxidizer (TO) from being overheated due to high oxidizer temperature, and protect it from Thermal Oxidizer shut-down and increase the overall practicality.

The third purpose of this disclosure is to provide an "System and method to prevent the oxidizer overheating using cold side bypass for a VOCs treatment system with series rotor", in which a Cold-Side Proportional Damper is installed on the First Desorption-Treated Air Pipeline, external air (fresh air or others) can access from the other end of the Cold-Side Proportional Damper. After the desorption-treated air generated from the Desorption Zone of the First Adsorption Rotor accesses the First Desorption-Treated Air Pipeline, and the temperature or concentration inside the First Desorption-Treated Air Pipeline becomes high, it can use the external air coming from the other end of the Cold-Side Proportional Damper to regulate the desorption-treated air in the First Desorption-Treated Air Pipeline, which can reduce the temperature or concentration and increase the overall operability.

DETAILED DESCRIPTION

Refer to FIG. 1-8, which are the schematic diagrams of this disclosure. The best performing method of the "System and method to prevent the oxidizer overheating using cold side bypass for a VOCs treatment system with series rotor" in this disclosure is applied in the volatilized organic waste air treatment system or its similar equipment in the semiconductor industry, optoelectronic industry or chemical industry, it is mainly used to take the effect of modulating the heat-recovery amount or concentration when the VOCs concentration becomes high, which can prevent the Thermal Oxidizer (TO) from being overheated due to high oxidizer temperature, and protect it from Thermal Oxidizer shutdown.

The System to prevent the oxidizer overheating using cold side bypass for a VOCs treatment system with series rotor of this disclosure mainly is a combination that includes a Thermal Oxidizer (TO) 10, a First Heat Exchanger 20, a Second Heat Exchanger 30, a Third Heat Exchanger 40, a First Cold-Side Transporting Pipeline 23, a First Adsorption Rotor 60, a Second Adsorption Rotor 70 and a Chimney 80 (see FIG. 1 to FIG. 4). The First Heat Exchanger 20 is equipped with the First Cold-Side Pipeline 21 and the First Hot-Side Pipeline 22, the Second Heat Exchanger 30 is equipped with the Second Cold-Side Pipeline 31 and the Second Hot-Side Pipeline 32, the Third Heat Exchanger 40 is equipped with the Third Cold-Side Pipeline 41 and the Third Hot-Side Pipeline 42. The Thermal Oxidizer (TO) 10 is equipped with a Burner 101 and a Chamber 102, the Burner 101 is connected with the Chamber 102, and the First Heat Exchanger 20, the Second Heat Exchanger 30 and the Third Heat Exchanger 40 are installed in the Chamber 102 of the Thermal Oxidizer (TO) 10. The Thermal Oxidizer (TO) 10 is equipped with the Entrance 11 and Exit 12 (as shown in FIG. 1 to FIG. 4), the Entrance 11 is installed at the Burner 101, the Exit 12 is at the Chamber 102 and is connected with the Chimney 80. From this arrangement, the organic gas can enter the Burner 101 via the Entrance 11 and is burnt therein, the burning exhaust is expelled from Exit 12 Chimney through Chamber 102 and discharged at Chimney 80, with the energy-saving effort.

Figure 1:
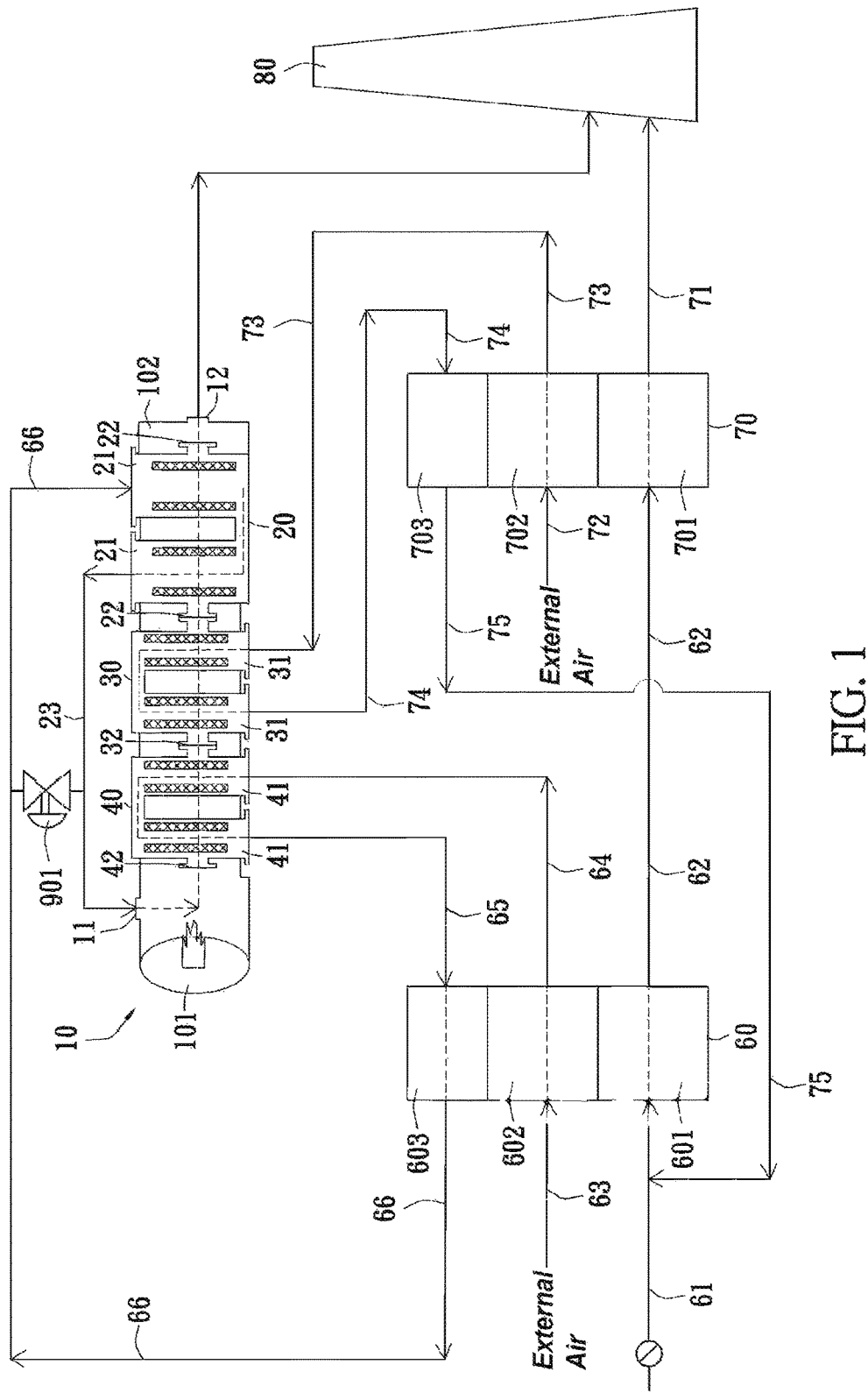
FIG. 1 is the system configuration schematic diagram of the Cold-Side Proportional Damper in the first performing pattern in which the First Heat Exchanger is installed by the Second Heat Exchanger.
Figure 2:
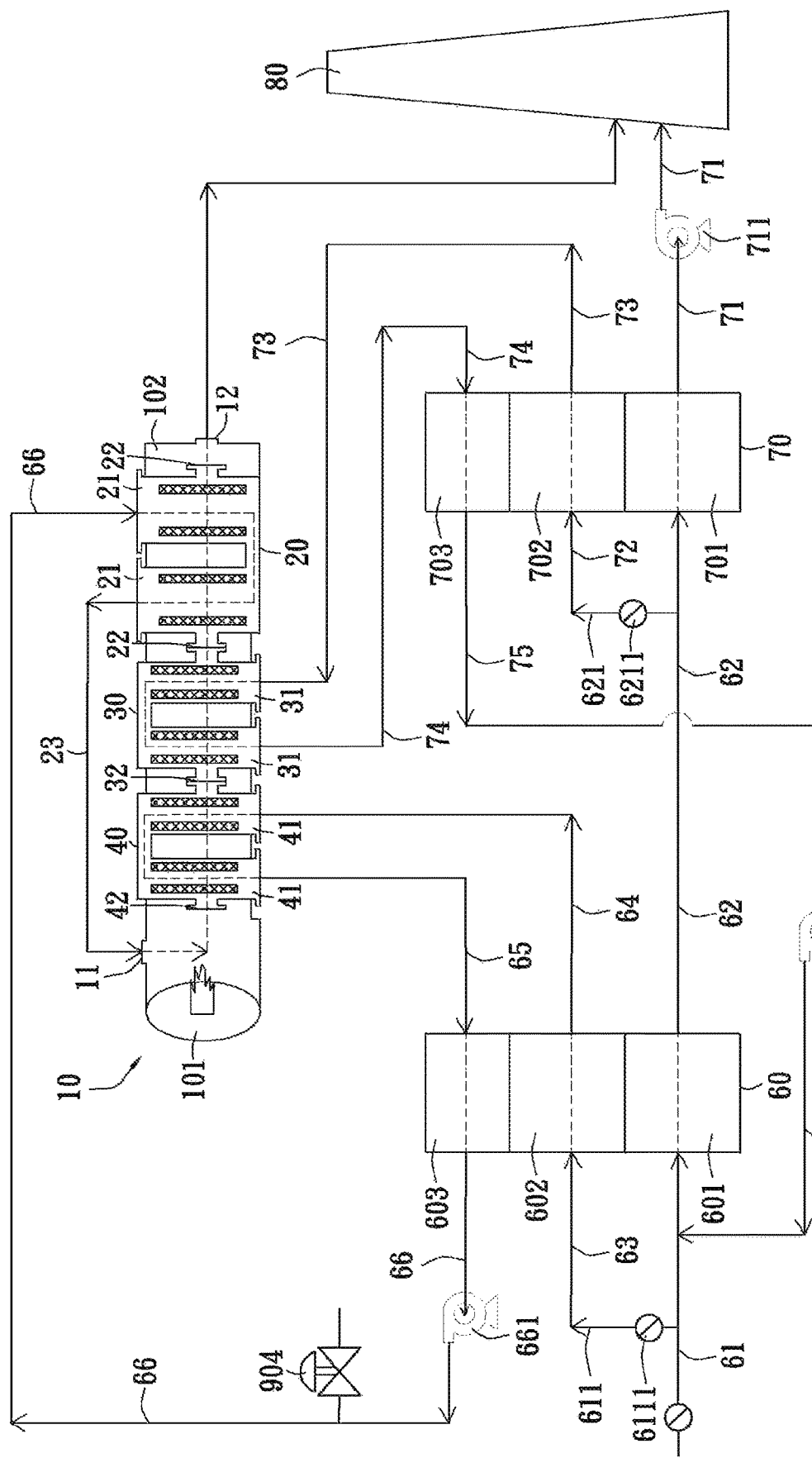
FIG. 2 is the system configuration schematic diagram of the Cold-Side Proportional Damper in the second performing pattern in which the First Heat Exchanger is installed by the Second Heat Exchanger.

The First Heat Exchanger 20 mentioned above has two performing pattern, the first performing pattern is to install the First Heat Exchanger 20 by the Second Heat Exchanger 30 (as shown in FIG. 1 and FIG. 2), making the Burner 101 of the Thermal Oxidizer (TO) 10 able to transport the incinerated hotter air to one side of the Third Hot-Side Pipeline 42 in the Third Heat Exchanger 40 and makes heat exchange, then, it is transported from the other side of the Third Hot-Side Pipeline 42 in the Third Heat Exchanger 40 to one side of the Second Hot-Side Pipeline 32 in the Second Heat Exchanger 30 and makes heat exchange, after that, the incinerated hotter air is transported from the other side of the Second Hot-Side Pipeline 32 in the Second Heat Exchanger 30 to one side of the First Hot-Side Pipeline 22 in the First Heat Exchanger 20 making heat exchange, finally, the incinerated hotter air is transported from the other side of the First Hot-Side Pipeline 22 in the First Heat Exchanger 20 to the Exit 12 of the Chamber 102 (as shown in FIG. 1 and FIG. 2), and the Exit 12 of Chamber 102 transports the incinerated air to the Chimney 80 and discharges it at Chimney 80.

Figure 3:
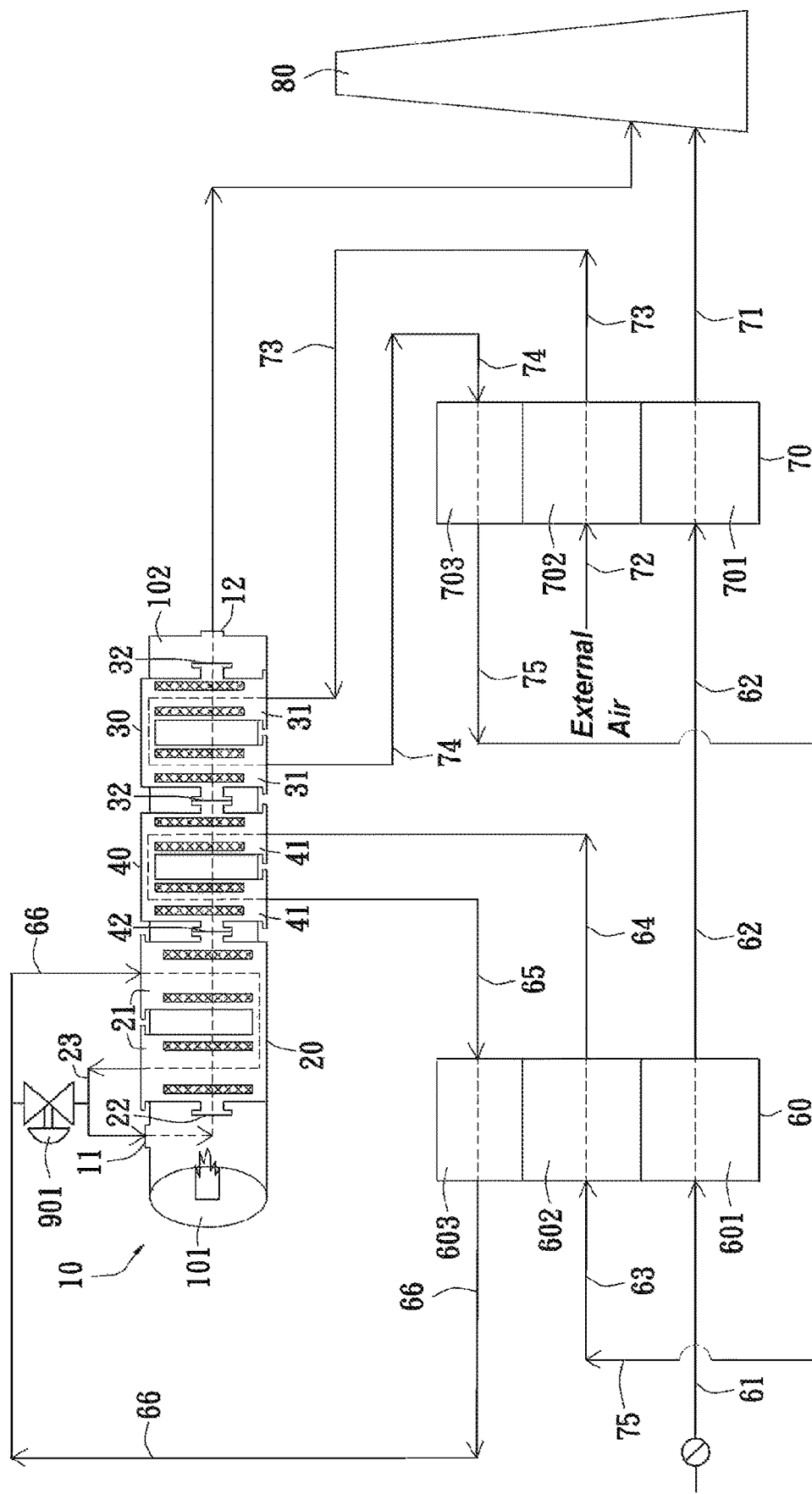
FIG. 3 is the system configuration schematic diagram of the Cold-Side Proportional Damper in the first performing pattern in which the First Heat Exchanger is installed by the Third Heat Exchanger.
Figure 4:
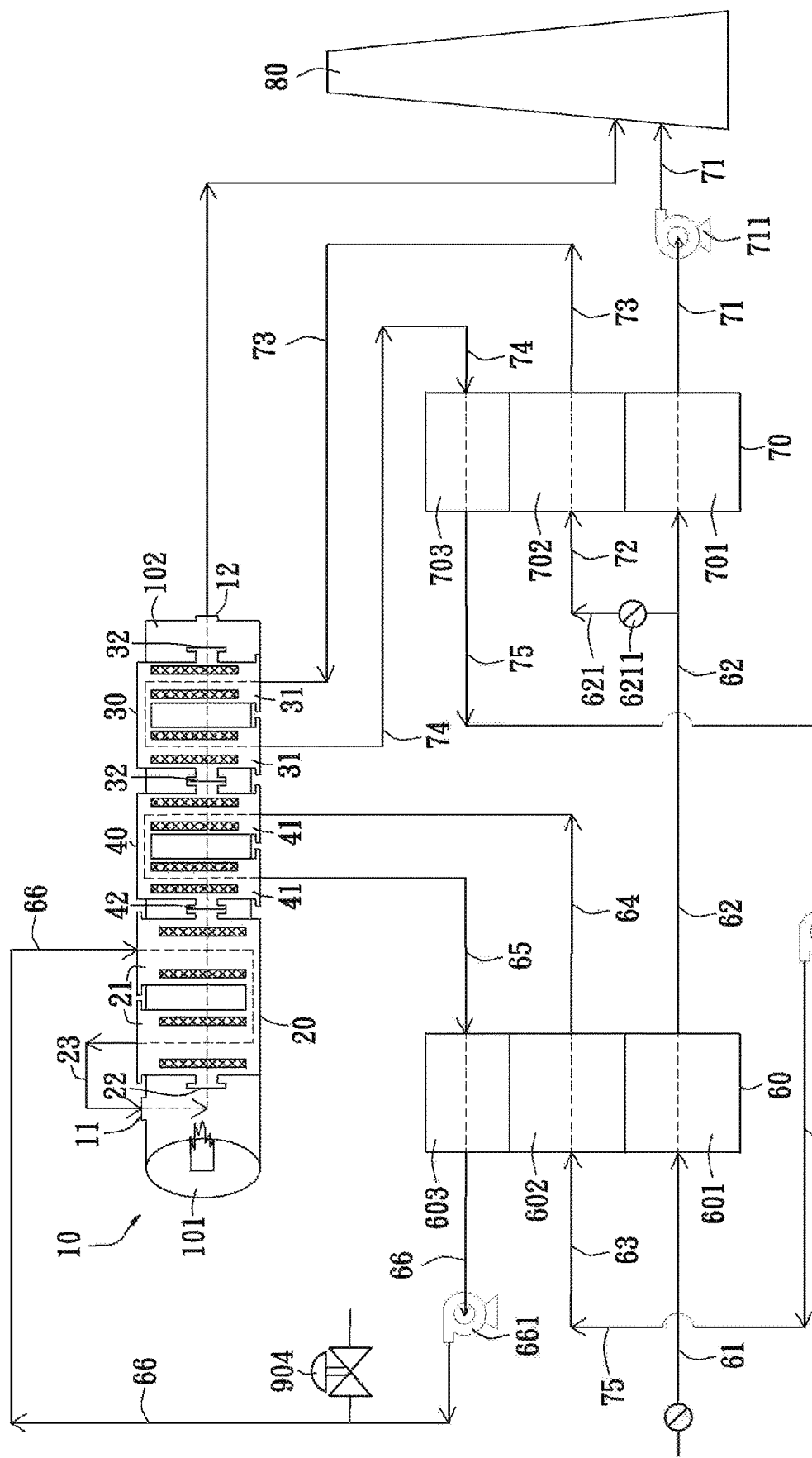
FIG. 4 is the system configuration schematic diagram of the Cold-Side Proportional Damper in the second performing pattern in which the First Heat Exchanger is installed by the Third Heat Exchanger.

The second implementing method is to install the First Heat Exchanger 20 by the Third Heat Exchanger 40 (as shown in FIG. 3 and FIG. 4), making the Burner 101 of the Thermal Oxidizer (TO) 10 transport the incinerated hotter air to one side of the First Hot-Side Pipeline 22 of the First Heat Exchanger 20 to perform heat exchange, and have the other side of the First Hot-Side Pipeline 22 in the First Heat Exchanger 20 transport the incinerated hotter air to one side of the Third Hot-Side Pipeline 42 in the Third Heat Exchanger 40 making heat exchange, then, have the other side of the Third Hot-Side Pipeline 42 in the Heat Exchanger 40 transport the incinerated hotter air to one side of the Second Hot-Side Pipeline 32 in the Second Heat Exchanger 30 making heat exchange. After that, the other side of the Second Hot-Side Pipeline 32 in the Second Heat Exchanger 30 transports the incinerated hotter air to the Exit 12 of the Chamber 102 (as shown in FIG. 3 and FIG. 4). Finally, the Exit 12 of the Chamber 102 transports the incinerated air to the Chimney 80 and discharges it therein.

Moreover, the First Adsorption Rotor 60 of this disclosure is equipped with the Adsorption Zone 601, the Cooling Zone 602 and the Desorption Zone 603. The First Adsorption Rotor 60 is connected with an Exhaust Air Intake Pipeline 61, a First Purified Air Discharge Pipeline 62, a First Cooling Air Intake Pipeline 63, a First Cooling Air Transporting Pipeline 64, a First Hotter Air Transporting Pipeline 65 and a First Desorption-Treated Air Pipeline 66 (as shown in FIG. 1 to FIG. 4). The Second Adsorption Rotor 70 is equipped with an Adsorption Zone 701, a Cooling Zone 702 and a Desorption Zone 703. The Second Adsorption Rotor 70 is connected with a Second Purified Air Discharge Pipeline 71, a Second Cooling Air Intake Pipeline 72, a Second Cooling Air Transporting Pipeline 73, a Second Hotter Air Transporting Pipeline 74 and a Second Desorption-Treated Air Pipeline 75. The First Adsorption Rotor 60 and the Second Adsorption Rotor 70 are the concentrating rotors made of zeolite or other materials.

One end of the Exhaust Air Intake Pipeline 61 is connected with one end of the Adsorption Zone 601 in the First Adsorption Rotor 60, making the Exhaust Air Intake Pipeline 61 able to transport the organic waste air to one side of the Adsorption Zone 601 in the First Adsorption Rotor 60, whereas one end of the First Purified Air Discharge Pipeline 62 is connected with the other side of the Adsorption Zone 601 in the First Adsorption Rotor 60, and one end of the First Purified Air Discharge Pipeline 62 is connected with one side of the Adsorption Zone 701 in the Second Adsorption Rotor 70, making the organic waste air goes through the Adsorption Zone 601 of First Adsorption Rotor 60 to adsorb the organic matters, and then the waste air is transported to the Adsorption Zone 701 in the Second Adsorption Rotor 70 through the First Purified Air Discharge Pipeline 62 (as shown in FIG. 1 to FIG. 4). The other side of the Adsorption Zone 701 in the Second Adsorption Rotor 70 is connected with the Second Purified Air Discharge Pipeline 71, the other end of the Second Purified Air Discharge Pipeline 71 is connected with the Chimney 80. The Second Purified Air Discharge Pipeline 71 is equipped with a Fan 711 (as shown in FIG. 2 and FIG. 4), the Fan 711 drafts the adsorbed air in the Second Purified Air Discharge Pipeline 71 to the Chimney 80 to discharge the adsorbed air.

One side of the Cooling Zone 602 in the First Adsorption Rotor 60 is connected with the First Cooling Air Intake Pipeline 63, which drives cooling air into the Cooling Zone 602 in the First Adsorption Rotor 60 making cooling purpose (as shown in FIG. 1 to FIG. 4), the other side of the Cooling Zone 602 in the First Adsorption Rotor 60 is connected with one end of the First Cooling Air Transporting Pipeline 64, the other end of the First Cooling Air Transporting Pipeline 64 is connected with one end of the Third Cold-Side Pipeline 41 in the Third Heat Exchanger 40, transporting the cooling air in the Cooling Zone 602 of the First Adsorption Rotor 60 to the Third Heat Exchanger 40 to make heat exchange (as shown in FIG. 1 to FIG. 4). Moreover, one end of the First Hotter Air Transporting Pipeline 65 is connected with the other side of the Desorption Zone 603 in the First Adsorption Rotor 60, the other end of the First Hotter Air Transporting Pipeline 65 is connected with the other end of the Third Cold-Side Pipeline 41 in the Third Heat Exchanger 40, transporting the hotter air that has made heat exchange in the Third Heat Exchanger 40 to the Desorption Zone 603 in the First Adsorption Rotor 60 via the First Hotter Air Transporting Pipeline 65 and performing desorption.

The Cooling Zone 602 in the First Adsorption Rotor 60 has two implementing methods. The first method is that the First Cooling Air Intake Pipeline 63 that is connected with one side of the Cooling Zone 602 in the First Adsorption Rotor 60 is used to supply fresh air or external air (as shown in FIG. 1), using fresh air or external air to cool down the Cooling Zone 602 in the First Adsorption Rotor 60. The second method is that the Exhaust Air Intake Pipeline 61 is equipped with a Waste Air Linking Pipeline 611, the other end of the Waste Air Linking Pipeline 611 is connected with the First Cooling Air Intake Pipeline 63 (as shown in FIG. 2), which transports the waste air in the Exhaust Air Intake Pipeline 61 to the Cooling Zone 602 in the First Adsorption Rotor 60 via the Waste Air Linking Pipeline 611 to make cooling effect, the Waste Air Linking Pipeline 611 is equipped with a Waste Air Linking Control Valve 6111 used to control the airflow of the Waste Air Linking Pipeline 611.

One side of the Cooling Zone 702 in the Second Adsorption Rotor 70 is connected with the Second Cooling Air Intake Pipeline 72, which allows cooling air to access the Cooling Zone 702 in the Second Adsorption Rotor 70 and make cooling effect (as shown in FIG. 1 to FIG. 4), the other side of the Cooling Zone 702 in the Second Adsorption Rotor 70 is connected with one end of the Second Cooling Air Transporting Pipeline 73, the other end of the Second Cooling Air Transporting Pipeline 73 is connected with one end of the Second Cold-Side Pipeline 31 in the Second Heat Exchanger 30, transporting the cooling air in the Cooling Zone 702 of the Second Adsorption Rotor 70 to the Second Heat Exchanger 30 to make heat exchange (as shown in FIG. 1 to FIG. 4). Moreover, one end of the Second Hotter Air Transporting Pipeline 74 is connected with the other side of the Desorption Zone 703 in the Second Adsorption Rotor 70, the other end of the Second Hotter Air Transporting Pipeline 74 is connected with the other end of the Second Cold-Side Pipeline 31 in the Second Heat Exchanger 30, transporting the hotter air to be heat-exchanged in the Second Heat Exchanger 30 to the Desorption Zone 703 in the Second Adsorption Rotor 70 via the Second Hotter Air Transporting Pipeline 74 to make desorption process.

The aforesaid Cooling Zone 702 in the Second Adsorption Rotor 70 has two implementing methods. The first method is that the Second Cooling Air Intake Pipeline 72 connecting to one side of the Cooling Zone 702 in the Second Adsorption Rotor 70 is used to supply fresh air or external air (as shown in FIG. 1), which uses fresh air or external air to cool down the Cooling Zone 702 in the Second Adsorption Rotor 70. The second method is that the First Purified Air Discharge Pipeline 62 is equipped with a First Purified Air Linking Pipeline 621, the other end of the First Purified Air Linking Pipeline 621 is connected with the Second Cooling Air Intake Pipeline 72 (as shown in FIG. 2 and FIG. 4), which transports the purified air in the First Purified Air Discharge Pipeline 62 to the Cooling Zone 702 in the Second Adsorption Rotor 70 via the First Purified Air Linking Pipeline 621 to make cooling effect, the First Purified Air Linking Pipeline 621 is equipped with a First Purified Air Linking Control Valve 6211 used to control the airflow of the First Purified Air Linking Pipeline 621.

One end of the First Desorption-Treated Air Pipeline 66 is connected with one side of the Desorption Zone 603 in the First Adsorption Rotor 60, the other end of the First Desorption-Treated Air Pipeline 66 is connected with one end of the First Cold-Side Pipeline 21 in the First Heat Exchanger 20, (as shown in FIG. 1 to FIG. 4), the other end of the First Cold-Side Pipeline 21 in the First Heat Exchanger 20 is connected with one end of the First Cold-Side Transporting Pipeline 23, the other end of the First Cold-Side Transporting Pipeline 23 is connected with the Exit 11 of the Thermal Oxidizer (TO) 10, enabling it to transport the desorption-treated air desorbed from high temperature to one end of the First Cold-Side Pipeline 21 in the First Heat Exchanger 20 via the First Desorption-Treated Air Pipeline 66, the other end of the First Cold-Side Pipeline 21 in the First Heat Exchanger 20 is used to transport the desorption-treated air to one end of the First Cold-Side Transporting Pipeline 23, the other end of the First Cold-Side Transporting Pipeline 23 is used to transport the desorption-treated air to the Entrance 11 of the Thermal Oxidizer (TO) 10 (as shown in FIG. 1 to FIG. 4), enabling the Burner 101 of the Thermal Oxidizer (TO) 10 to make high-temperature pyrolysis and reduce the volatile organic compounds. The First Desorption-Treated Air Pipeline 66 is equipped with a Fan 661, which can Drives the desorption-treated air into one end of the First Cold-Side Pipeline 21 in the First Heat Exchanger 20.

One end of the Second Desorption-Treated Air Pipeline 75 is connected with one side of the Desorption Zone 703 in the Second Adsorption Rotor 70, the other end of the Second Desorption-Treated Air Pipeline 75 has two implementing methods. The first method is that the other end of the Second Desorption-Treated Air Pipeline 75 is connected with the Exhaust Air Intake Pipeline 61 (as shown in FIG. 1 and FIG. 2), making the concentrated desorption-treated air access the Adsorption Zone 601 in the First Adsorption Rotor 60 via the Exhaust Air Intake Pipeline 61 to perform adsorption once again. The second method is that the other end of the Second Desorption-Treated Air Pipeline 75 is connected with the First Cooling Air Intake Pipeline 63 (as shown in FIG. 3 and FIG. 4), making the concentrated air access the Cooling Zone 602 of the First Adsorption Rotor 60 via the First Cooling Air Intake Pipeline 63 and makes cooling effect. Moreover, the Second Desorption-Treated Air Pipeline 75 is equipped with a Fan 751 (as shown in FIG. 2 and FIG. 4), which drafts the desorption-treated air into the Exhaust Air Intake Pipeline 61 or the First Cooling Air Intake Pipeline 63. Thus, the desorbed air generated from the Desorption Zone 703 of the Second Adsorption Rotor 70 can enter the Adsorption Zone 601 of the First Adsorption Rotor 60 or the Cooling Zone 602 of the First Adsorption Rotor 60 to make circulating utilization and improve the treating efficiency of organic waste air.

Moreover, the System to prevent the oxidizer overheating using cold side bypass for a VOCs treatment system with series rotor mainly has two implementing patterns, the Thermal Oxidizer (TO) 10, the First Heat Exchanger 20, the Second Heat Exchanger 30, the Third Heat Exchanger 40, the First Cold-Side Transporting Pipeline 23, the First Adsorption Rotor 60, the Second Adsorption Rotor 70 and the Chimney 80 in these two implementing patterns apply the same design. Therefore, the contents of aforesaid Thermal Oxidizer (TO) 10, First Heat Exchanger 20, Second Heat Exchanger 30, Third Heat Exchanger 40, First Cold-Side Transporting Pipeline 23, First Adsorption Rotor 60, Second Adsorption Rotor 70 and Chimney 80 are not to be illustrated repeatedly, please refer to the above statements.

The difference in the first implementing pattern (as shown in FIG. 1 and FIG. 3) is that there is an additional Cold-Side Proportional Damper 901 installed between the First Desorption-Treated Air Pipeline 66 and the First Cold-Side Transporting Pipeline 23, one end of the Cold-Side Proportional Damper 901 is connected with the First Desorption-Treated Air Pipeline 66, the other end of the Cold-Side Proportional Damper 901 is connected with the First Cold-Side Transporting Pipeline 23. It uses the Cold-Side Proportional Damper 901 to modulate the airflows of the First Desorption-Treated Air Pipeline 66 and the First Cold-Side Transporting Pipeline 23. Therefore, when the VOCs concentration in the First Cold-Side Transporting Pipeline 23 becomes high, part of the desorption-treated air in the First Desorption-Treated Air Pipeline 66 can be transported to the First Cold-Side Transporting Pipeline 23 through the Cold-Side Proportional Damper 901, which makes the desorption-treated air in the First Cold-Side Transporting Pipeline 23 mix up with the desorption-treated air in the First Desorption-Treated Air Pipeline 66 once again, making part of the desorption-treated air in the First Desorption-Treated Air Pipeline 66 with lower temperature cool down the desorption-treated air in the First Cold-Side Transporting Pipeline 23 with higher temperature. Therefore, when the VOCs concentration is high, it can use the Cold-Side Proportional Damper 901 to control the airflow and modulate the heat-recovery amount or concentration, preventing the Thermal Oxidizer (TO) 10 from being overheated due to high oxidizer temperature or even resulting in shutdown during the treatment of organic waste air.

The difference in the second implementing pattern (as shown in FIG. 2 and FIG. 4) is that there is an additional Cold-Side Proportional Damper 904 installed in the First Desorption-Treated Air Pipeline 66, the other end of the Cold-Side Proportional Damper 904 lets external air (fresh air or other gases) come in, using the Cold-Side Proportional Damper 904 to control the airflow of the First Desorption-Treated Air Pipeline 66. Therefore, when the desorption-treated air generated from the Desorption Zone 603 of the First Adsorption Rotor 60 accesses the First Desorption-Treated Air Pipeline 66 and the temperature or concentration in the First Desorption-Treated Air Pipeline 66 becomes higher, it can input the external air from the other end of the Cold-Side Proportional Damper 904 making modulation, which makes the desorption-treated air in the First Desorption-Treated Air Pipeline 66 have cooling or concentration-down effect.

The Method to prevent the oxidizer overheating using cold side bypass for a VOCs treatment system with series rotor of this disclosure is mainly used in the organic waste air treatment system, including the combination of a Thermal Oxidizer (TO) 10, a First Heat Exchanger 20, a Second Heat Exchanger 30, a Third Heat Exchanger 40, a First Cold-Side Transporting Pipeline 23, a First Adsorption Rotor 60, a Second Adsorption Rotor 70 and a Chimney 8 (as shown in FIG. 1 to FIG. 4), in which the First Heat Exchanger 20 is equipped with the First Cold-Side Pipeline 21 and the First Hot-Side Pipeline 22, the Second Heat Exchanger 30 is equipped with the Second Cold-Side Pipeline 31 and the Second Hot-Side Pipeline 32, the Third Heat Exchanger 40 is equipped with the Third Cold-Side Pipeline 41 and the Third Hot-Side Pipeline 42. One end of the First Cold-Side Transporting Pipeline 23 is connected with the other end of the First Cold-Side Pipeline 21, the other end of the First Cold-Side Transporting Pipeline 23 is connected with the Entrance 11 of the Thermal Oxidizer (TO) 10. The Thermal Oxidizer (TO) 10 is equipped with a Burner 101 and a Chamber 102, the H Burner 101 is connected with the Chamber 102, the First Heat Exchanger 20, Second Heat Exchanger 30, Third Heat Exchanger 40 are installed in the Chamber 102 of the Thermal Oxidizer (TO) 10. The Thermal Oxidizer (TO) 10 is equipped with the Entrance 11 and Exit 12 (as shown in FIG. 1 to FIG. 4), the Entrance 11 is installed at the Burner 101, the Entrance 11 is connected with the other end of the First Cold-Side Transporting Pipeline 23. Moreover, the Exit 12 is installed at the Chamber 102 and is connected with the Chimney 80, organic waste air can enter the Burner 101 through the Entrance 11 and incinerates therein, the incinerated air can pass through the Chamber 102 and is discharged in the Chimney 80 through the Exit 12, which make the energy-saving effect.

The First Adsorption Rotor 60 of this disclosure is equipped with the Adsorption Zone 601, the Cooling Zone 602 and the Desorption Zone 603. The First Adsorption Rotor 60 is connected with an Exhaust Air Intake Pipeline 61, a First Purified Air Discharge Pipeline 62, a First Cooling Air Intake Pipeline 63, a First Cooling Air Transporting Pipeline 64, a First Hotter Air Transporting Pipeline 65 and a First Desorption-Treated Air Pipeline 66 (as shown in FIG. 1 to FIG. 4). The Second Adsorption Rotor 70 is equipped with the Adsorption Zone 701, the Cooling Zone 702 and the Desorption Zone 703, the Second Adsorption Rotor 70 is connected with a Second Purified Air Discharge Pipeline 71, a Second Cooling Air Intake Pipeline 72, a Second Cooling Air Transporting Pipeline 73, a Second Hotter Air Transporting Pipeline 74 and a Second Desorption-Treated Air Pipeline 75 (as shown in FIG. 1 to FIG. 4). The First Adsorption Rotor 60 and the Second Adsorption Rotor 70 are the concentration rotors made of zeolite or other materials.

Figure 5:
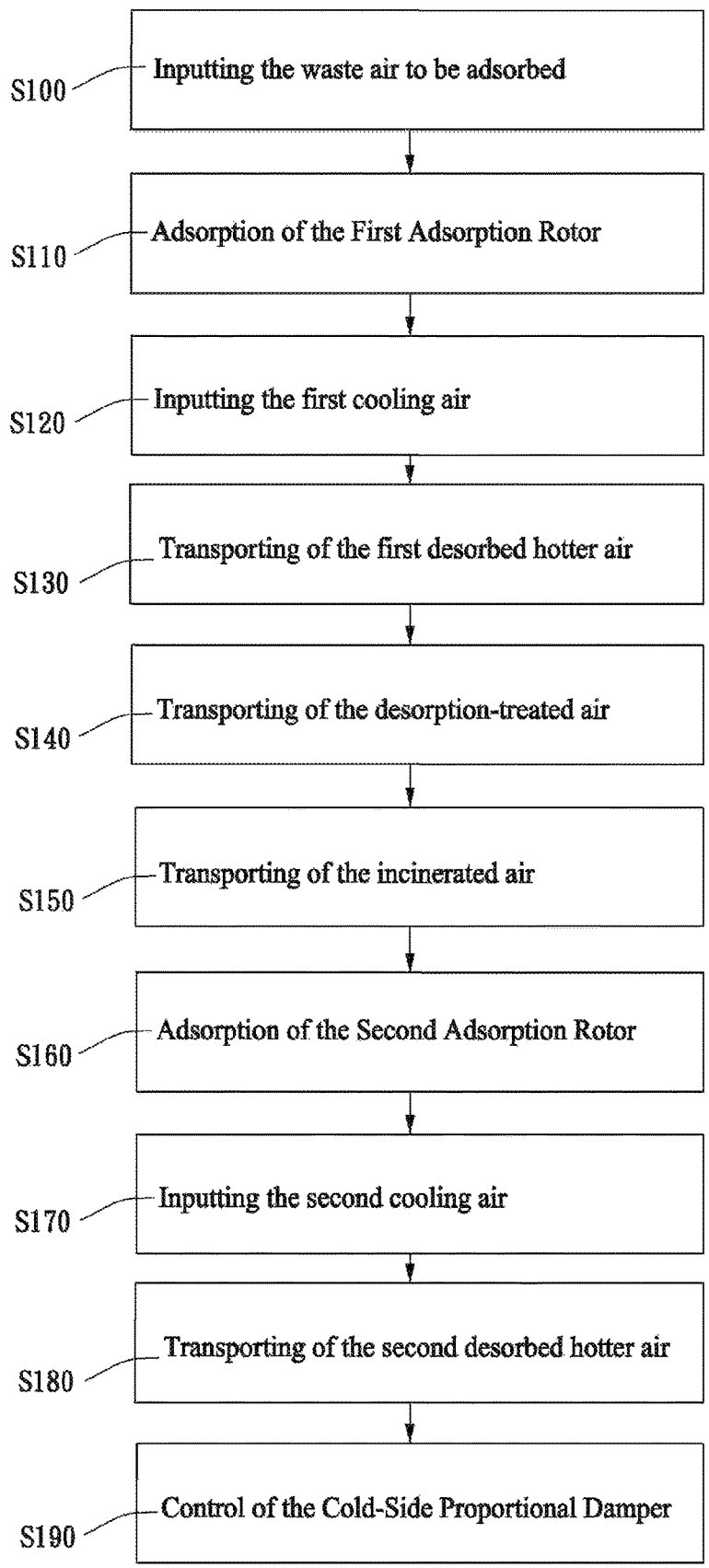
FIG. 5 is the main step flowchart of the first performing pattern in this disclosure.

The main steps of the control method (as shown in FIG. 5) include: The Step S100 Inputting the waste air to be adsorbed: Sending the waste air to one side of the Adsorption Zone 601 in the First Adsorption Rotor 60 through the other side of the Exhaust Air Intake Pipeline 61. After the Step 100 is completed, proceed with Step S110.

Step S110 Adsorption of the First Adsorption Rotor: It performs adsorption through the Adsorption Zone 601 of the First Adsorption Rotor 60, and outputs the adsorbed waste air from the other side of the Adsorption Zone 601 in the First Adsorption Rotor 60 to the Adsorption Zone 701 of the Second Adsorption Rotor 70 through the other side of the First Purified Air Discharge Pipeline 62. After the Step 110 is completed, proceed with Step S120.

The Second Purified Air Discharge Pipeline 71 is connected with the other side of the Adsorption Zone 701 in the Second Adsorption Rotor 70 as illustrated in Step S110 above, the other end of the Second Purified Air Discharge Pipeline 71 is connected with the Chimney 80. The Second Purified Air Discharge Pipeline 71 is equipped with a Fan 711 (as shown in FIG. 2 and FIG. 4), using the Fan 711 to draft the adsorbed air in the Second Purified Air Discharge Pipeline 71 to the Chimney 80 and discharges it.

The Step 120 Inputting the first cooling air: The cooling air coming from the other side of the First Cooling Air Intake Pipeline 63 is transported to the Cooling Zone 602 of the First Adsorption Rotor 60 to perform cooling. It transports the cooling air that has passed through the Cooling Zone 602 of the First Adsorption Rotor to one end of the Third Cold-Side Pipeline 41 in the Third Heat Exchanger 40 through the other end of the First Cooling Air Transporting Pipeline 64. After Step S120 is completed, proceed with Step S130.

The Cooling Zone 602 of the First Adsorption Rotor 60 in Step S120 has two implementing methods. The first method is that the First Cooling Air Intake Pipeline 63 connecting to the Cooling Zone 602 of the First Adsorption Rotor 60 provides the entrance of fresh air or external air (as shown in FIG. 1), using the fresh air or external air to cool down the Cooling Zone 602 of the First Adsorption Rotor 60. The second method is that the Exhaust Air Intake Pipeline 61 is equipped with a Waste Air Linking Pipeline 611, the other side of the Waste Air Linking Pipeline 611 is connected with the First Cooling Air Intake Pipeline 63 (as shown in FIG. 2), which transports the waste air in the Exhaust Air Intake Pipeline 61 to the Cooling Zone 602 in the First Adsorption Rotor 60 via the Waste Air Linking Pipeline 611 to make cooling effect, the Waste Air Linking Pipeline 611 is equipped with a Waste Air Linking Control Valve 6111 to control the airflow of the Waste Air Linking Pipeline 611.

The Step S130 Transporting of the first desorbed hotter air: Through the First Hotter Air Transporting Pipeline 65 connected with the other side of the Third Cold-Side Pipeline 41 in the Third Heat Exchanger 40, the hotter air is transported to the Desorption Zone 603 of the First Adsorption Rotor 60 to perform desorption. Then, through the other end of the First Desorption-Treated Air Pipeline 66, the desorption-treated air is transported to one side of the First Cold-Side Pipeline 21 in the First Heat Exchanger 20. After Step S130 is complete, proceed with Step S140.

The First Desorption-Treated Air Pipeline 66 stated in Step S130 is equipped with a Fan 661 (as shown in FIG. 2 and FIG. 4), which can draft the desorption-treated air to the First Cold-Side Pipeline 21 in the First Heat Exchanger 20.

The Step S140 Transporting of the desorption-treated air: Through the First Cold-Side Transporting Pipeline 23 connected with the other end of the First Cold-Side Pipeline 21 in the First Heat Exchanger 20, the desorption-treated air is transported to the Entrance 11 of the Thermal Oxidizer (TO) 10. After the Step S140 is complete, perform the next Step S150.

The Step S150 Transporting of the incinerated air: Transporting the incinerated air burnt in the Burner 101 of the Thermal Oxidizer (TO) 10 to one end of the Third Hot-Side Pipeline 42 in the Third Heat Exchanger 40, the other end of the Third Hot-Side Pipeline 42 in the Third Heat Exchanger 40 transports the incinerated air to one end of the Second Hot-Side Pipeline 32 in the Second Heat Exchanger 30, and let the other end of the Second Hot-Side Pipeline 32 in the Second Heat Exchanger 30 transport the incinerated air to one end of the First Hot-Side Pipeline 22 in the First Heat Exchanger 20. Finally, let the other end of the First Hot-Side Pipeline 22 in the First Heat Exchanger 20 send the incinerated air to the Exit 12 of the Thermal Oxidizer (TO) 10. After the Step S150 is complete, perform the next Step S160.

The Thermal Oxidizer (TO) 10 stated in Step 150 transports the incinerated hotter air to one side of the Third Hot-Side Pipeline 42 of the Third Heat Exchanger 40 (as shown in FIG. 1), the other side of the Third Hot-Side Pipeline 42 of the Third Heat Exchanger 40 transports the incinerated hotter air to one side of the Second Hot-Side Pipeline 32 in the Second Heat Exchanger 30 performing heat exchange. Next, the other side of the Second Hot-Side Pipeline 32 in the Second Heat Exchanger 30 transports the incinerated hotter air to one side of the First Hot-Side Pipeline 22 in the First Heat Exchanger 20 performing heat exchange. Finally, the other side of the First Hot-Side Pipeline 22 in the First Heat Exchanger 20 transports the incinerated hotter air to the Exit 12 of the Chamber 102, and the Exit 12 of the Chamber 102 transports the incinerated air to the Chimney 80 to discharge the incinerated air.

The Step S160 Adsorption of the Second Adsorption Rotor: Transporting the adsorbed air in the First Purified Air Discharge Pipeline 62 to one side of the Adsorption Zone 701 in the Second Adsorption Rotor 70 and perform adsorption, then, transporting the second-adsorbed air to the Chimney 80 via the Second Purified Air Discharge Pipeline 71 to discharge off. After the Step S160 is complete, perform the next Step S170.

The Step S170 Inputting the second cooling air: Transporting the cooling air to the Cooling Zone 702 of the Second Adsorption Rotor 70 to perform cooling through the other end of the Second Cooling Air Intake Pipeline 72. Then, transporting the cooling air that has passed through the Cooling Zone 702 of the Second Adsorption Rotor 70 to one end of the Second Cold-Side Pipeline 31 in the Second Heat Exchanger 30 via the other end of the Second Cooling Air Transporting Pipeline 73. After the Step S170 is completed is complete, perform the next Step S180.

The Cooling Zone 702 of the Second Adsorption Rotor 70 stated in the above Step S170 has two implementing methods. The first implementing method is that the Second Cooling Air Intake Pipeline 72 connected with one side of the Cooling Zone 702 in the Second Adsorption Rotor 70 is to conduct fresh air or external air in (as shown in FIG. 1). The fresh air or external air is used to cool down the Cooling Zone 702 of the Second Adsorption Rotor 70. The second implementing method is that the First Purified Air Discharge Pipeline 62 is equipped with a First Purified Air Linking Pipeline 621, the other end of the First Purified Air Linking Pipeline 621 is connected with the Second Cooling Air Intake Pipeline 72 (as shown in FIG. 2 and FIG. 4), transporting the air in the First Purified Air Discharge Pipeline 62 to the Cooling Zone 702 of the Second Adsorption Rotor 70 via the First Purified Air Linking Pipeline 621 to perform cooling work. The First Purified Air Linking Pipeline 621 is equipped with a First Purified Air Linking Control Valve 6211, which is used to control the airflow of the First Purified Air Linking Pipeline 621.

The Step S180 Transporting of the second desorbed hotter air: The hotter air is transported to the Desorption Zone 703 of the Second Adsorption Rotor 70 via the Second Hotter Air Transporting Pipeline 74 connected with the other end of the Second Cold-Side Pipeline 31 of the Second Heat Exchanger 30 to perform desorption, and is outputted via the other end of the Second Desorption-Treated Air Pipeline 75. After the Step S180 is completed is complete, perform the next Step S190.

In Step S180 above, the other end of the Second Desorption-Treated Air Pipeline 75 has two implementing method. The first implementing method is that the other end of the Second Desorption-Treated Air Pipeline 75 is connected with the Exhaust Air Intake Pipeline 61 (as shown in FIG. 1 and FIG. 2), enabling the concentrated air to enter the Adsorption Zone 601 of the First Adsorption Rotor 60 again via the Exhaust Air Intake Pipeline 61 to perform adsorption once again. The second implementing method is that the other end of the Second Desorption-Treated Air Pipeline 75 is connected with the First Cooling Air Intake Pipeline 63 (as shown in FIG. 3 and FIG. 4), which enables the concentrated air to enter the Cooling Zone 602 of the First Adsorption Rotor 60 again via the First Cooling Air Intake Pipeline 63 to perform cooling. Moreover, the Second Desorption-Treated Air Pipeline 75 is equipped with a Fan 751, which can draft the desorption-treated air into the Exhaust Air Intake Pipeline 61 or the First Cooling Air Intake Pipeline 63, making the desorbed air generated from the Desorption Zone 703 of the Second Adsorption Rotor 70 enter the Adsorption Zone 601 of the First Adsorption Rotor 60 or the Cooling Zone 602 of the First Adsorption Rotor 60 to perform circulated utilization and improve the treating efficiency of organic waste air.

The next Step S190 Control of the Cold-Side Proportional Damper: Installing a Cold-Side Proportional Damper 901 between the First Desorption-Treated Air Pipeline 66 and the First Cold-Side Transporting Pipeline 23, using the Cold-Side Proportional Damper 901 to control the airflows of the First Desorption-Treated Air Pipeline 66 and the First Cold-Side Transporting Pipeline 23.

In Step S190 above, one end of the Cold-Side Proportional Damper 901 is connected with the First Desorption-Treated Air Pipeline 66, the other end of the Cold-Side Proportional Damper 901 is connected with the First Cold-Side Transporting Pipeline 23 (as shown in FIG. 1), using the Cold-Side Proportional Damper 901 to control the airflows of the First Desorption-Treated Air Pipeline 66 and the First Cold-Side Transporting Pipeline 23. Therefore, when the VOCs concentration in the First Cold-Side Transporting Pipeline 23 becomes thick, it can transport part of the desorption-treated air in the First Desorption-Treated Air Pipeline 66 to the First Cold-Side Transporting Pipeline 23 through the Cold-Side Proportional Damper 901, enabling the desorption-treated air in the First Cold-Side Transporting Pipeline 23 to mix up with part of the desorption-treated air in the First Desorption-Treated Air Pipeline 66 once again, making part of the desorption-treated air in the First Desorption-Treated Air Pipeline 66 with lower temperature cool down the desorption-treated air in the First Cold-Side Transporting Pipeline 23 with higher temperature. Through this way, when the VOCs concentration becomes high, it can use the Cold-Side Proportional Damper 901 to control the airflow and have the effect of modulating the heat-recovery amount or concentration, which can prevent the Thermal Oxidizer (TO) 10 from being overheated due to high oxidizer temperature or even result in shutdown during the treatment of organic gas.

Moreover, the Method to prevent the oxidizer overheating using cold side bypass for a VOCs treatment system with series rotor mainly has four implementing patterns. The Step S100 Inputting the waste air to be adsorbed, the Step S110 Adsorption of the First Adsorption Rotor, the Step S120 Inputting the first cooling air, the Step S130 Transporting of the first desorbed hotter air, the Step S140 Transporting of the desorption-treated air, the Step S150 Transporting of the incinerated air, the Step S160 Adsorption of the Second Adsorption Rotor, the Step S170 Inputting the second cooling air, the Step S180 Transporting of the second desorbed hotter air and the Step S190 Control of the Cold-Side Proportional Damper in the first implementing pattern (as shown in FIG. 5) are interpreted in above, please refer them accordingly.

Figure 6:
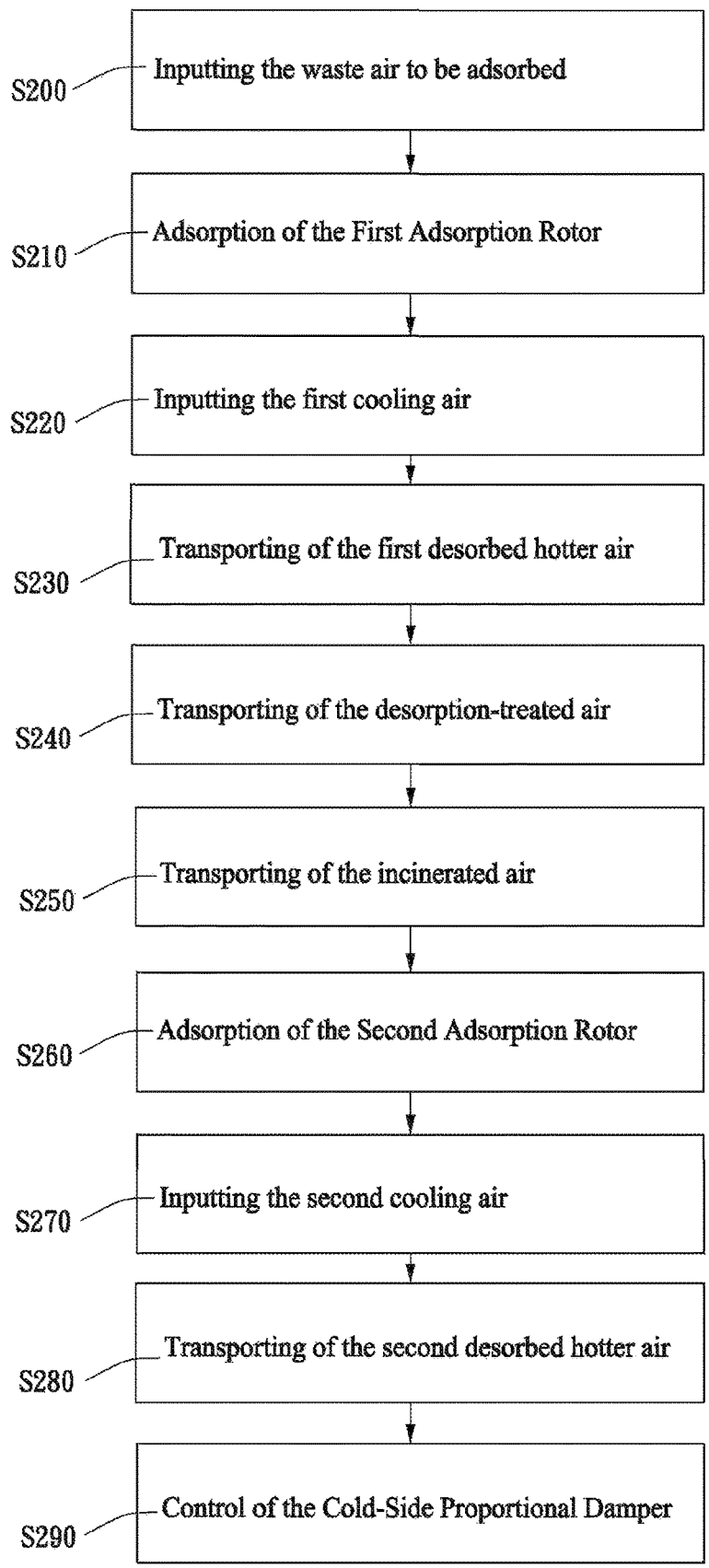
FIG. 6 is the main step flowchart of the second performing pattern in this disclosure.
Figure 7:
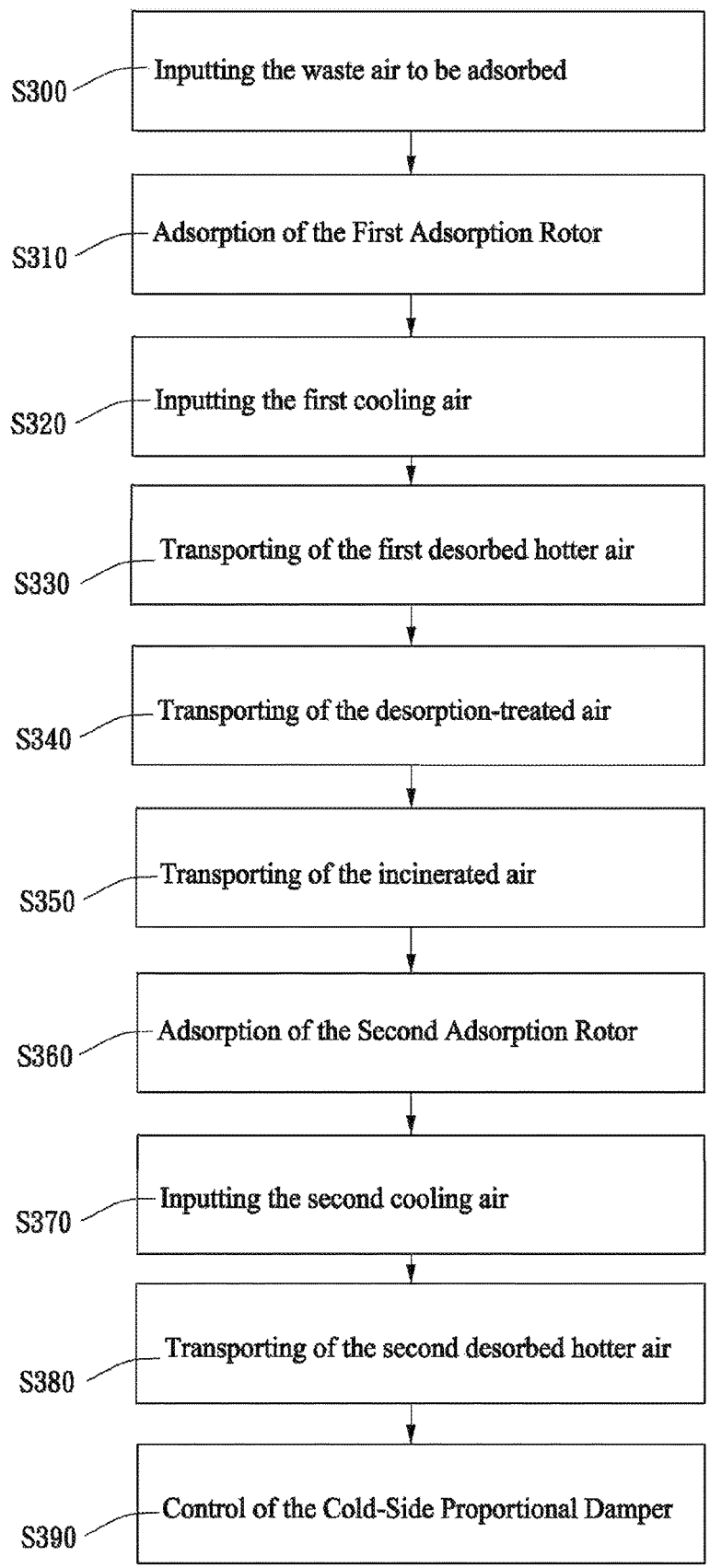
FIG. 7 is the main step flowchart of the third performing pattern in this disclosure.
Figure 8:
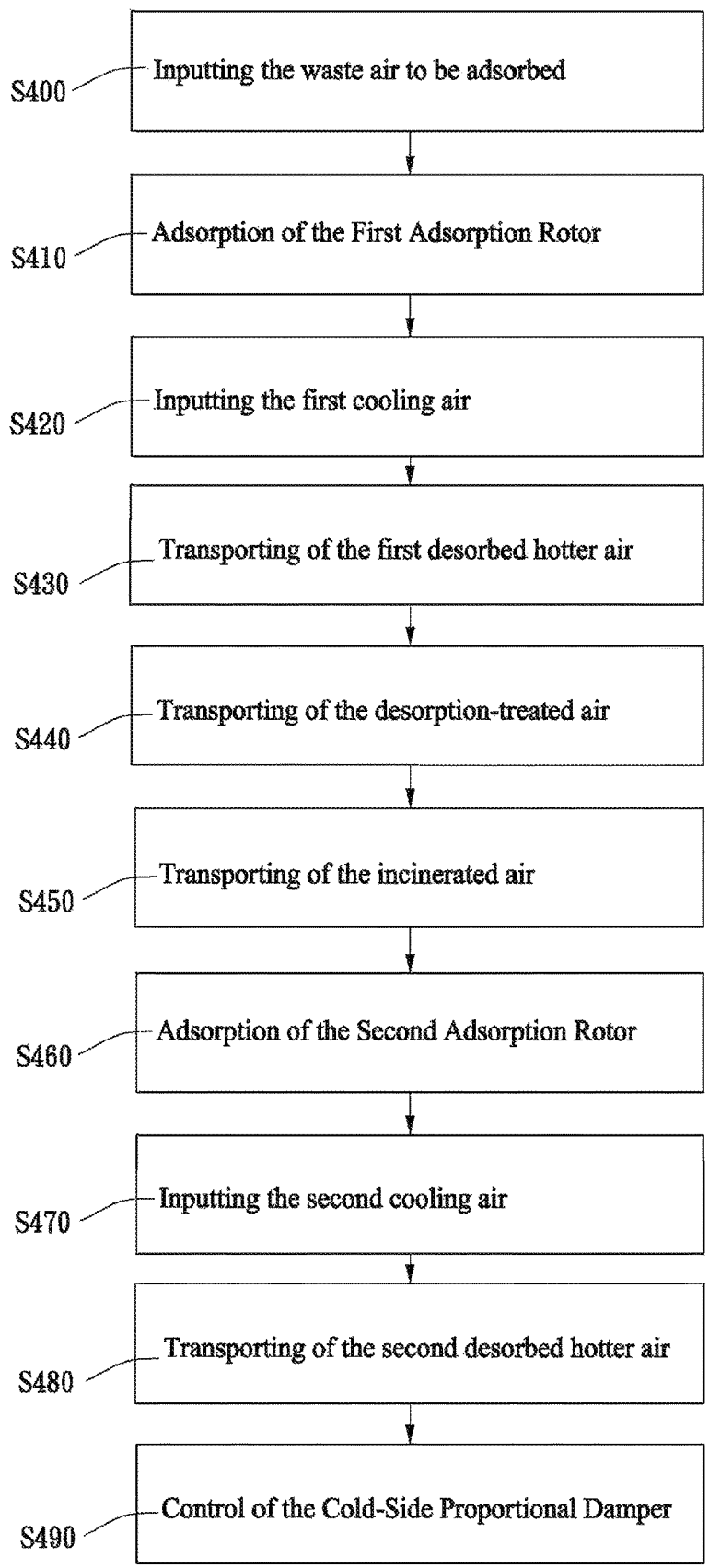
FIG. 8 is the main step flowchart of the fourth performing pattern in this disclosure.

The Step S200 Inputting the waste air to be adsorbed, the Step S210 Adsorption of the First Adsorption Rotor, the S220 Inputting the first cooling air, the Step S230 Transporting of the first desorbed hotter air, the Step S240 Transporting of the desorption-treated air, the Step S250 Transporting of the incinerated air, the Step S260 Adsorption of the Second Adsorption Rotor, the Step S270 Inputting the second cooling air and the Step S280 Transporting of the second desorbed hotter air in the second implementing pattern (as shown in FIG. 6), the Step S300 Inputting the waste air to be adsorbed, the Step S310 Adsorption of the First Adsorption Rotor, the Step S320 Inputting the first cooling air, the Step S330 Transporting of the first desorbed hotter air, Step S340 Transporting of the desorption-treated air, the Step S350 Transporting of the incinerated air, the Step S360 Adsorption of the Second Adsorption Rotor, the Step S370 inputting the second cooling air and the Step S380 Transporting of the second desorbed hotter air in the second implementing pattern (as shown in FIG. 7), the Step S400 Inputting the waste air to be adsorbed, the Step S410 Adsorption of the First Adsorption Rotor, the Step S420 Inputting the first cooling air, the Step S430 Transporting of the first desorbed hotter air, the Step S440 Transporting of the desorption-treated air, the Step S450 Transporting of the incinerated air, the Step S460 Adsorption of the Second Adsorption Rotor, the Step S470 inputting the second cooling air and the Step S480 Transporting of the second desorbed hotter air in the fourth implementing pattern (as shown in FIG. 8) are all under the same design of the Step S100 Inputting the waste air to be adsorbed, the Step S110 Adsorption of the First Adsorption Rotor, the S120 Inputting the first cooling air, the Step S130 Transporting of the first desorbed hotter air, the Step S140 Transporting of the desorption-treated air, the Step S150 Transporting of the incinerated air, the Step S160 Adsorption of the Second Adsorption Rotor, the Step S170 inputting the second cooling air and the Step S180 Transporting of the second desorbed hotter air in the first implementing pattern (as shown in FIG. 1), the difference is merely on the S150 Transporting of the incinerated air and the Step S190 Control of the Cold-Side Proportional Damper.

Therefore, the contents identical to Step S100 Inputting the waste air to be adsorbed, the Step S110 Adsorption of the First Adsorption Rotor, the Step S120 Inputting the first cooling air, the Step S130 Transporting of the first desorbed hotter air, the Step S140 Transporting of the desorption-treated air, the Step S150 Transporting of the incinerated air, the Step S160 Adsorption of the Second Adsorption Rotor, the Step S170 Inputting the second cooling air and the Step S180 Transporting of the second desorbed hotter air are not to be interpreted repeatedly, please refer to the above interpretation. The following will interpret the Step 250 Transporting of the incinerated air and the Step S290 Control of the Cold-Side Proportional Damper in the second implementing pattern (as shown in FIG. 6), the Step 350 Transporting of the incinerated air and the Step S390 Control of the Cold-Side Proportional Damper in the third implementing pattern (as shown in FIG. 7) and the Step 450 Transporting of the incinerated air and the Step S490 Control of the Cold-Side Proportional Damper in the fourth implementing pattern (as shown in FIG. 8).

The difference of the second implementing pattern (as shown in FIG. 6) is on Step S250 Transporting of the incinerated air: Transporting the incinerated air made at the Burner 101 of the Thermal Oxidizer (TO) 10 to one side of the First Hot-Side Pipeline 22 in the First Heat Exchanger 20, the other side of the First Hot-Side Pipeline 22 in the First Heat Exchanger 20 transports the air to one side of the Third Hot-Side Pipeline 42 in the Third Heat Exchanger 40, the other side of the Third Hot-Side Pipeline 42 in the Second Heat Exchanger 40 transports the air to one side of the Second Hot-Side Pipeline 32 in the Second Heat Exchanger 30, and the other side of the Second Hot-Side Pipeline 32 in the Second Heat Exchanger 30 transports the air to the Exit 12 of the Thermal Oxidizer (TO) 10.

In Step S250 stated above, the Burner 101 of the Thermal Oxidizer (TO) 10 can transport the incinerated hotter air to one side of the First Hot-Side Pipeline 22 in the First Heat Exchanger making heat exchange 20 (see FIG. 3), the other side of the First Hot-Side Pipeline 22 in the First Heat Exchanger making heat exchange 20 transports the incinerated hotter air to one side of the Third Hot-Side Pipeline 42 in the Third Heat Exchanger 40, the other side of the Third Hot-Side Pipeline 42 in the Second Heat Exchanger 40 transports the air to one side of the Second Hot-Side Pipeline 32 in the Second Heat Exchanger 30, the other side of the Second Hot-Side Pipeline 32 in the Second Heat Exchanger 30 transports the exhaust air to the Exit 12 of the Chamber 102, and the Exit 12 of the Chamber 102 transports the exhaust air to the Chimney 80 and discharges it therein.

For the Step 290 Control of the Cold-Side Proportional Damper: Equip a Cold-Side Proportional Damper 901 between the First Desorption-Treated Air Pipeline 66 and the First Cold-Side Transporting Pipeline 23, use the Cold-Side Proportional Damper 901 to control the airflows of the First Desorption-Treated Air Pipeline 66 and the First Cold-Side Transporting Pipeline 23.

In the Step S290 above, one end of the Cold-Side Proportional Damper 901 is connected with the First Desorption-Treated Air Pipeline 66, the other end of the Cold-Side Proportional Damper 901 in connected with the First Cold-Side Transporting Pipeline 23 (as shown in FIG. 3), using the Cold-Side Proportional Damper 901 to control the airflows of the First Desorption-Treated Air Pipeline 66 and the First Cold-Side Transporting Pipeline 23. Therefore, when the VOCs concentration in the First Cold-Side Transporting Pipeline 23 becomes high, the Cold-Side Proportional Damper 901 can transport part of the desorption-treated air in the First Desorption-Treated Air Pipeline 66 to the First Cold-Side Transporting Pipeline 23, making the desorption-treated air in the First Cold-Side Transporting Pipeline 23 mix up with part of the desorption-treated air in the First Desorption-Treated Air Pipeline 66 once again, enabling part of the low-temperature desorption-treated air in the First Desorption-Treated Air Pipeline 66 to cool down the high-temperature desorption-treated air in the First Cold-Side Transporting Pipeline 23. Thus, when the VOCs concentration becomes high, it can control the airflow through the Cold-Side Proportional Damper 901 and has the effect of modulating the heat-recovery amount or concentration, which can prevent the Thermal Oxidizer (TO) 10 from being overheated due to high oxidizer temperature, or even result in shutdown during the treatment of organic waste air.

The difference of the third implementing pattern (as shown in FIG. 7) is on the Step S350 Transporting of the incinerated air: Transporting the incinerated air made in the Burner 101 of the Thermal Oxidizer 10 to one side of the Third Hot-Side Pipeline 42 in the Third Heat Exchanger 40, the other side of the Third Hot-Side Pipeline 42 in the Third Heat Exchanger 40 transports the incinerated air to one side of the Second Hot-Side Pipeline 32 in the Second Heat Exchanger 30, the other side of the Second Hot-Side Pipeline 32 in the Second Heat Exchanger 30 transports the incinerated air to one side of the First Hot-Side Pipeline 22 in the First Heat Exchanger 20, and the other side of the First Hot-Side Pipeline 22 in the First Heat Exchanger 20 transports the incinerated air to the Exit 12 of the Thermal Oxidizer (TO) 10.

In the Step S 350 above, the Burner 101 Of the Thermal Oxidizer (TO) 10 can transport the incinerated air to one side of the Third Hot-Side Pipeline 42 in the Third Heat Exchanger 40 (see FIG. 2), the other side of the Third Hot-Side Pipeline 42 in the Third Heat Exchanger 40 transports the incinerated air to one side of the Second Hot-Side Pipeline 32 in the Second Heat Exchanger 30, the other side of the Second Hot-Side Pipeline 32 in the Second Heat Exchanger 30 transports the incinerated air to one side of the First Hot-Side Pipeline 22 in the First Heat Exchanger 20, and the other side of the First Hot-Side Pipeline 22 in the First Heat Exchanger 20 transports the incinerated air to the Exit 12 of the Chamber 102, and the Exit 12 of the Chamber 102 transports the exhaust air to the Chimney 80 and discharges it therein.

Step S390 Control of the Cold-Side Proportional Damper: Install a Cold-Side Proportional Damper 904 at the First Desorption-Treated Air Pipeline 66, the other end of the Cold-Side Proportional Damper 904 is for the access of external air, use the Cold-Side Proportional Damper 904 to control the airflow of the First Desorption-Treated Air Pipeline 66.

In the Step S390 stated above, the other end of the Cold-Side Proportional Damper 904 lets external air come in (as shown in FIG. 2), the external air can be fresh air or other gases. Use the Cold-Side Proportional Damper 904 to control the airflow of the First Desorption-Treated Air Pipeline 66. Therefore, after the desorption-treated air generated from the Desorption Zone 603 of the First Adsorption Rotor 60 has entered the First Desorption-Treated Air Pipeline 66, and when the temperature or concentration in the First Desorption-Treated Air Pipeline 66 becomes high, it can use the external air inputted from the other end of the Cold-Side Proportional Damper 904 to modulate and have the desorption-treated air in the First Desorption-Treated Air Pipeline 66 perform the cooling or concentration-reducing effect.

The difference of the fourth implementing pattern (as shown in FIG. 8) is on the Step S450 Transporting of the incinerated air: Transporting the incinerated air made at the Burner 101 of the Thermal Oxidizer (TO) 10 to one side of the First Hot-Side Pipeline 22 in the First Heat Exchanger 20, the other side of the First Hot-Side Pipeline 22 in the First Heat Exchanger 20 transports the air to one side of the Third Hot-Side Pipeline 42 in the Third Heat Exchanger 40, the other side of the Third Hot-Side Pipeline 42 in the Second Heat Exchanger 40 transports the air to one side of the Second Hot-Side Pipeline 32 in the Second Heat Exchanger 30, and the other side of the Second Hot-Side Pipeline 32 in the Second Heat Exchanger 30 transports the air to the Exit 12 of the Thermal Oxidizer (TO) 10.

In Step S450 stated above, the Burner 101 of the Thermal Oxidizer (TO) 10 can transport the incinerated hotter air to one side of the First Hot-Side Pipeline 22 in the First Heat Exchanger making heat exchange 20 (see FIG. 4), the other side of the First Hot-Side Pipeline 22 in the First Heat Exchanger making heat exchange 20 transports the incinerated hotter air to one side of the Third Hot-Side Pipeline 42 in the Third Heat Exchanger 40, the other side of the Third Hot-Side Pipeline 42 in the Second Heat Exchanger 40 transports the air to one side of the Second Hot-Side Pipeline 32 in the Second Heat Exchanger 30, the other side of the Second Hot-Side Pipeline 32 in the Second Heat Exchanger 30 transports the exhaust air to the Exit 12 of the Chamber 102, and the Exit 12 of the Chamber 102 transports the exhaust air to the Chimney 80 and discharges it therein.

Step S490 Control of the Cold-Side Proportional Damper: Install a Cold-Side Proportional Damper 904 at the First Desorption-Treated Air Pipeline 66, the other end of the Cold-Side Proportional Damper 904 is for the access of external air, use the Cold-Side Proportional Damper 904 to control the airflow of the First Desorption-Treated Air Pipeline 66.

In the Step S490 stated above, the other end of the Cold-Side Proportional Damper 904 lets external air come in (as shown in FIG. 4), the external air can be fresh air or other gases. Use the Cold-Side Proportional Damper 904 to control the airflow of the First Desorption-Treated Air Pipeline 66. Therefore, after the desorption-treated air generated from the Desorption Zone 603 of the First Adsorption Rotor 60 has entered the First Desorption-Treated Air Pipeline 66, and when the temperature or concentration in the First Desorption-Treated Air Pipeline 66 becomes high, it can use the external air inputted from the other end of the Cold-Side Proportional Damper 904 to modulate and have the desorption-treated air in the First Desorption-Treated Air Pipeline 66 perform the cooling or concentration-reducing effect.

Yet, the above statements are only the better embodiments of this disclosure, which cannot be treated as the limiting of this disclosure. Therefore, all simple and equivalent changes and modifications made according to the claims or disclosure description shall be within the scope covered in this disclosure patent.

The invention claimed is:

1. A system to prevent an oxidizer overheating using cold side bypass for a volatile organic compounds (VOCs) treatment system with a series rotor, comprising:
    a thermal oxidizer (TO) comprising a burner and a chamber, wherein the burner and the chamber are linked together, the thermal oxidizer has an entrance and an exit, the entrance is at the burner, and the exit is at the chamber;
    a first heat exchanger installed in the chamber of the thermal oxidizer, wherein the first heat exchanger comprises a first cold-side pipeline and a first hot-side pipeline;
    a second heat exchanger installed in the chamber of the thermal oxidizer, wherein the second heat exchanger comprises a second cold-side pipeline and a second hot-side pipeline;
    a third heat exchanger installed in the chamber of the thermal oxidizer, wherein the third heat exchanger comprises a third cold-side pipeline and a third hot-side pipeline;
    a first cold-side transporting pipeline, wherein a first end of the first cold-side transporting pipeline is connected with an end of the first cold-side pipeline, and a second end of the first cold-side transporting pipeline is connected with the entrance of the thermal oxidizer;
    a first adsorption rotor comprising an adsorption zone, a cooling zone, and a desorption zone, wherein the first adsorption rotor is connected with an exhaust air intake pipeline, a first purified air discharge pipeline, a first cooling air intake pipeline, a first cooling air transporting pipeline, a first hot air transporting pipeline, and a first desorption-treated air pipeline;
    wherein an end of the exhaust air intake pipeline is connected with a first side of the adsorption zone in the first adsorption rotor, an end of the first purified air discharge pipeline is connected with a second side of the adsorption zone in the first adsorption rotor, an end of the first cooling air intake pipeline is connected with a first side of the cooling zone in the first adsorption rotor, a first end of the first cooling air transporting pipeline is connected with a second side of the cooling zone in the first adsorption rotor, a second end of the first cooling air transporting pipeline is connected with a first end of the third cold-side pipeline in the third heat exchanger, a first end of the first hot air transporting pipeline is connected with a first side of the desorption zone in the first adsorption rotor, a second end of the first hot air transporting pipeline is connected with a second end of the third cold-side pipeline in the third heat exchanger, a first end of the first desorption-treated air pipeline is connected with a second side of the desorption zone in the first adsorption rotor, and a second end of the first desorption-treated air pipeline is connected with the end of the first cold-side pipeline in the first heat exchanger;
    a second adsorption rotor comprises the adsorption zone, the cooling zone and the desorption zone, wherein the second adsorption rotor is connected with a second purified air discharge pipeline, a second cooling air intake pipeline, a second cooling air transporting pipeline, a second hot air transporting pipeline, and a second desorption-treated air pipeline;
    wherein the end of the first purified air discharge pipeline is connected with a first side of the adsorption zone in the second adsorption rotor, a first end of the second purified air discharge pipeline is connected with a second side of the adsorption zone in the second adsorption rotor, an end of the second cooling air intake pipeline is connected to a first side of the cooling zone in the second adsorption rotor, a first end of the second cooling air transporting pipeline is connected with a second side of the cooling zone in the second adsorption rotor, a second end of the second cooling air transporting pipeline is connected with a first end of the second cold-side pipeline in the second heat exchanger, a first end of the second hot air transporting pipeline is connected with a first side of the desorption zone in the second adsorption rotor, a second end of the second hot air transporting pipeline is connected with a second end of the second cold-side pipeline in the second heat exchanger, and a first end of the second desorption-treated air pipeline is connected with a second side of the desorption zone in the second adsorption rotor;
    a chimney connected with a second end of the second purified air discharge pipeline; and
    a cold-side proportional damper, wherein a first end of the cold-side proportional damper is connected with the first desorption-treated air pipeline, and a second end of the cold-side proportional damper is connected with the first cold-side transporting pipeline.

2. The system to prevent the oxidizer overheating using cold side bypass for a VOCs treatment system with series rotor as claimed in claim 1, wherein the exit of the thermal oxidizer is further connected to the chimney.

3. The system to prevent the oxidizer overheating using cold side bypass for a VOCs treatment system with series rotor as claimed in claim 1, wherein the first cooling air intake pipeline is configured to access fresh air or external air.

4. The system to prevent the oxidizer overheating using cold side bypass for a VOCs treatment system with series rotor as claimed in claim 1, wherein the second cooling air intake pipeline is configured to access fresh air or external air.

5. The system to prevent the oxidizer overheating using cold side bypass for a VOCs treatment system with series rotor as claimed in claim 1, wherein the exhaust air intake pipeline further comprises a waste air linking pipeline, wherein the waste air linking pipeline is connected with the first cooling air intake pipeline, and the waste air linking pipeline further comprises a waste air linking control valve used to control an airflow of the waste air linking pipeline.

6. The system to prevent the oxidizer overheating using cold side bypass for a VOCs treatment system with series rotor as claimed in claim 1, wherein the first purified air discharge pipeline further comprises a first purified air linking pipeline, the first purified air linking pipeline is connected with the second cooling air intake pipeline, and the first purified air linking pipeline further comprises a first purified air linking control valve to control an airflow of the first purified air linking pipeline.

7. The system to prevent the oxidizer overheating using cold side bypass for a VOCs treatment system with series rotor as claimed in claim 1, wherein the first desorption-treated air pipeline further comprises a fan.

8. The system to prevent the oxidizer overheating using cold side bypass for a VOCs treatment system with series rotor as claimed in claim 1, wherein the second desorption-treated air pipeline further comprises a fan.

9. The system to prevent the oxidizer overheating using cold side bypass for a VOCs treatment system with series rotor as claimed in claim 1, wherein the second purified air discharge pipeline further comprises a fan.

10. The system to prevent the oxidizer overheating using cold side bypass for a VOCs treatment system with series rotor as claimed in claim 1, wherein a second end of the second desorption-treated air pipeline is connected with the exhaust air intake pipeline.

11. The system to prevent the oxidizer overheating using cold side bypass for a VOCs treatment system with series rotor as claimed in claim 1, wherein a second end of the second desorption-treated air pipeline is further connected with the first cooling air intake pipeline.

12. A system to prevent an oxidizer overheating using cold side bypass for a volatile organic compounds (VOCs) treatment system with a series rotor, comprising:
 a thermal oxidizer (TO) comprising a burner and a chamber, wherein the burner and the chamber are linked together, the thermal oxidizer has an entrance and an exit, the entrance is at the burner, and the exit is at the chamber;
 a first heat exchanger installed in the chamber of the thermal oxidizer, wherein the first heat exchanger comprises a first cold-side pipeline and a first hot-side pipeline;
 a second heat exchanger installed in the chamber of the thermal oxidizer, wherein the second heat exchanger comprises a second cold-side pipeline and a second hot-side pipeline;
 a third heat exchanger installed in the chamber of the thermal oxidizer, wherein the third heat exchanger comprises a third cold-side pipeline and a third hot-side pipeline;
 a first cold-side transporting pipeline, wherein a first end of the first cold-side transporting pipeline is connected with an end of the first cold-side pipeline, and a second end of the first cold-side transporting pipeline is connected with the entrance of the thermal oxidizer;
 a first adsorption rotor comprising an adsorption zone, a cooling zone, and a desorption zone, wherein the first adsorption rotor is connected with an exhaust air intake pipeline, a first purified air discharge pipeline, a first cooling air intake pipeline, a first cooling air transporting pipeline, a first hot air transporting pipeline, and a first desorption-treated air pipeline;
 wherein an end of the exhaust air intake pipeline is connected with a first side of the adsorption zone in the first adsorption rotor, an end of the first purified air discharge pipeline is connected with a second side of the adsorption zone in the first adsorption rotor, an end of the first cooling air intake pipeline is connected with a first side of the cooling zone in the first adsorption rotor, a first end of the first cooling air transporting pipeline is connected with second side of the cooling zone in the first adsorption rotor, a second end of the first cooling air transporting pipeline is connected with a first end of the third cold-side pipeline in the third heat exchanger, a first end of the first hot air transporting pipeline is connected with a first side of the desorption zone in the first adsorption rotor, a second end of the first hot air transporting pipeline is connected with a second end of the third cold-side pipeline in the third heat exchanger, a first end of the first desorption-treated air pipeline is connected with a second side of the desorption zone in the first adsorption rotor, and a second end of the first desorption-treated air pipeline is connected with the end of the first cold-side pipeline in the first heat exchanger;
 a second adsorption rotor comprising the adsorption zone, cooling zone, and desorption zone, wherein the second adsorption rotor is connected with a second purified air discharge pipeline, a second cooling air intake pipeline, a second cooling air transporting pipeline, a second hot air transporting pipeline and a second desorption-treated air pipeline;
 wherein the end of the first purified air discharge pipeline is connected with a first side of the adsorption zone in the second adsorption rotor, a first end of the second purified air discharge pipeline is connected with a second side of the adsorption zone in the second adsorption rotor, an end of the second cooling air intake pipeline is connected with a first side of the cooling zone in the second adsorption rotor, a first end of the second cooling air transporting pipeline is connected with a second side of the cooling zone in the second adsorption rotor, a second end of the second cooling air transporting pipeline is connected with a first end of the second cold-side pipeline in the second heat exchanger, a first end of the second hot air transporting pipeline is connected with a first side of the desorption zone in the second adsorption rotor, a second end of the second hot air transporting pipeline is connected with a second end of the second cold-side pipeline in the second heat exchanger, and a first end of the second desorption-treated air pipeline is connected with a second side of the desorption zone in the second adsorption rotor;
 a chimney connected with a second end of the second purified air discharge pipeline; and
 a cold-side proportional damper, wherein a first end of the cold-side proportional damper is connected with the first desorption-treated air pipeline, and a second end of the cold-side proportional damper is connected with the fourth cold-side transporting pipeline.

13. The system to prevent the oxidizer overheating using cold side bypass for a VOCs treatment system with series rotor as claimed in claim 12, wherein the exit of the thermal oxidizer is further connected to the chimney.

14. The system to prevent the oxidizer overheating using cold side bypass for a VOCs treatment system with series rotor as claimed in claim 12, wherein the first cooling air intake pipeline is configured to access fresh air or external air.

15. The system to prevent the oxidizer overheating using cold side bypass for a VOCs treatment system with series rotor as claimed in claim 12, wherein the second cooling air intake pipeline is configured to access fresh air or external air.

16. The system to prevent the oxidizer overheating using cold side bypass for a VOCs treatment system with series rotor as claimed in claim 12, wherein the exhaust air intake pipeline is further comprises a waste air linking pipeline, the waste air linking pipeline is connected with the first cooling air intake pipeline, and the waste air linking pipeline is further comprises a waste air linking control valve used to control an airflow of the waste air linking pipeline.

17. The system to prevent the oxidizer overheating using cold side bypass for a VOCs treatment system with series rotor as claimed in claim 12, wherein the first purified air discharge pipeline is further comprises a first purified air linking pipeline, the first purified air linking pipeline is connected with the second cooling air intake pipeline, and the first purified air linking pipeline is further comprises a first purified air linking control valve to control an airflow of the first purified air linking pipeline.

18. The system to prevent the oxidizer overheating using cold side bypass for a VOCs treatment system with series rotor as claimed in claim 12, wherein the first desorption-treated air pipeline is further comprises a fan.

19. The system to prevent the oxidizer overheating using cold side bypass for a VOCs treatment system with series rotor as claimed in claim 12, wherein the second desorption-treated air pipeline is further comprises a fan.

20. The system to prevent the oxidizer overheating using cold side bypass for a VOCs treatment system with series rotor as claimed in claim 12, wherein the second purified air discharge pipeline is further comprises a fan.

21. The system to prevent the oxidizer overheating using cold side bypass for a VOCs treatment system with series rotor as claimed in claim 12, wherein a second end of the second desorption-treated air pipeline is connected with the exhaust air intake pipeline.

22. The system to prevent the oxidizer overheating using cold side bypass for a VOCs treatment system with series rotor as claimed in claim 12, wherein a second end of the second desorption-treated air pipeline is further connected with the first cooling air intake pipeline.

\* \* \* \* \*